W. PLUMER.
Process and Apparatus for the Manufacture of
Fertilizers.
No. 228,387. Patented June 1, 1880.
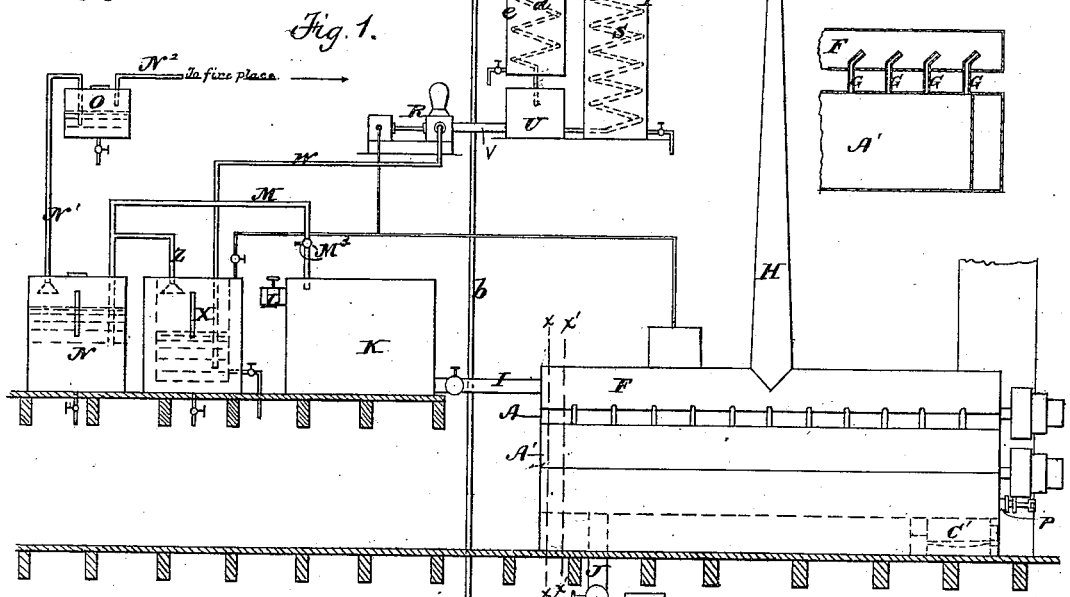
Witnesses.
Geo. W. Pierce
Neol Fairchild
Inventor,
Wm Plumer
by Wright & Brown
Attys.

UNITED STATES PATENT OFFICE.

WILLIAM PLUMER, OF LEXINGTON, ASSIGNOR TO HIMSELF, WM. PLUMER, JR., AND FREDK. N. LORD, OF SAME PLACE, AND GEORGE B. JONES, OF NEWTON, MASSACHUSETTS.

PROCESS AND APPARATUS FOR THE MANUFACTURE OF FERTILIZERS.

SPECIFICATION forming part of Letters Patent No. 228,387, dated June 1, 1880.

Application filed December 23, 1879.

*To all whom it may concern:*

Be it known that I, WILLIAM PLUMER, of Lexington, in the county of Middlesex and State of Massachusetts, have invented certain Improvements in Processes and Apparatus for the Manufacture of Fertilizers, of which the following is a specification.

This invention has for its object to deprive night-soil or other raw fertilizing material of its noxious gases and injurious properties and convert it into a dry innoxious fertilizer having all the valuable properties originally contained in the raw material.

To this end the invention consists as a whole in heating the raw material for the double purpose of desiccating it and expelling its noxious gases and vapors, mingling antiseptic vapor with the desiccated material to destroy any noxious gases and spores of infectious diseases not removed by desiccation, saving or fixing in the form of crude sulphate of ammonia the free ammonia necessarily escaping with the gases and vapors during the desiccating operation, and mixing the crude sulphate of ammonia with the disinfected desiccated material to complete the fertilizer, the latter being then ready for transportation and use.

My invention consists, also, in a process for disinfecting the dried materials from the retorts, and in the apparatus whereby the several processes are carried out, all of which I will now proceed to describe and claim.

Of the accompanying drawings, forming a part of this specification, Figure 1 represents a side elevation of an apparatus embodying my invention. Fig. 2 represents a section on line $x$ $x$, Fig. 1. Fig. 3 represents a section on line $z$ $z$, Fig. 2. Fig. 4 represents a section on line $y$ $y$, Fig. 2. Figs. 1$^a$, 3$^a$, 5, 6, 7, and 8, represent views of details.

Similar letters of reference refer to like parts in all of the figures.

In carrying out my invention I provide chambers or retorts A A', two being the number preferred, although the number may be varied according to circumstances. These retorts are preferably cylindrical, and are strongly built of boiler-iron, and each is set horizontally. When two retorts are employed one is located above the other, as shown in Fig. 2, so that matter can pass from one to the other by gravitation through an inclined tube, B.

The retorts may both be heated by a furnace, C, located under the retort A, although, if desired, the retort A' may be provided with a furnace, C', as shown in dotted lines in Fig. 1. Each retort is provided with a longitudinal rotating stirrer and propeller, E, which is preferably composed of two series of blades or arms, E', each set obliquely on a collar, $E^2$, which is provided with a many-sided socket, $E^3$, the latter fitting on a correspondingly-shaped shaft, $E^4$, as shown in Figs. 2, 6, and 7. The shaft is rotated by any suitable means.

The form of the shaft $E^4$ and sockets $E^3$ enables the arms to be set so as to radiate in various directions. The arms are arranged spirally, and each arm is set obliquely in its collar by means of a many-sided lug, $E^5$, on its end fitting a corresponding hole, $E^6$, in the collar, as shown in Figs. 6, 7, and 8.

The arms E' are preferably separated from each other by narrow spaces or slots, as shown in Fig. 3.

F represents a chamber connected by several pipes, G, with the upper portions of the retorts A A'. This chamber receives steam and gases from the retorts, and such steam and gases pass off through a pipe, H, to apparatus hereinafter described.

The retort A is provided with a pipe, I, for the introduction into said retort of material to be desiccated, and the retort A' is provided with a pipe, J, for the discharge of the material after the desiccating process. The pipes I J are provided with gates or valves, whereby they may be tightly closed, and when the apparatus is in operation the retorts A A' are hermetically closed.

The pipe B, which connects the retorts A A', is located near the ends of said retorts, opposite the ends with which the pipes I and J connect, so that material entering the retorts has to pass entirely through both before escaping.

When night-soil or other material which does not require grinding or crushing is to be operated on, it is introduced into the retort A from a receiving-tank, K, which is connected with the pipe I, and has a pipe, L, to which may be connected a hose from a night-soil receptacle to fill said tank K.

M represents a pipe passing from the top of the tank K to a tank, N, containing sulphuric acid, in which the end of pipe M is immersed; or, instead of sulphuric acid, the tank may contain niter or any other chemical which is an absorbent of free ammonia. While the tank K is being filled with night-soil the free ammonia and gases escaping pass through the pipe M and into the sulphuric acid, which arrests the free ammonia and fixes it as sulphate of ammonia. The remaining gases pass out through a pipe, N', and into a tank, O, containing a suitable liquid deodorizer, such as water saturated with carbolic acid. Here the gases are partially deodorized and absorbed, and the remaining gases pass through a pipe, $N^2$, to a furnace, where they are consumed.

The escape of free ammonia and gases from the tank K takes place at all times when said tank contains fermenting matter, escape being greatest in warm weather.

The pipe M is provided with a spring-valve, $M^3$, which is constructed to open automatically to allow air to enter the receiving-tank K when the contents of the latter are being emptied into the retort A.

Fig. $1^a$ shows a section of the valve, the same having a lateral opening, M', with an outwardly-closing spring-valve, $M^2$, which is adapted to open under a pressure of less than fifteen pounds, and yields to allow air to enter the pipe M without allowing gases to escape from the tank into the air.

The material passes continuously from the receiving-tank K through the pipe I into the retort A, the quantity passing being regulated by a valve in said pipe I.

The automatic valve $M^3$, by opening to permit air to enter the receiving-tank, prevents the sulphuric acid from being drawn into the receiving-tank from the tank N, and from thence into the retort, and thereby preventing danger of explosion.

The stirrer or propeller in the retort A is rotated in the proper direction to force the material toward the pipe B. In its passage through the retort A the material becomes partially dried and pulverized, and when it reaches the pipe B it passes down the latter into the retort A', and is forced in the opposite direction by the stirrer E in the latter retort, and usually becomes sufficiently dry by the time it reaches the pipe J. If the material is not sufficiently dry, however, after passing through either retort, the stirrers may be reversed, so as to carry the material again through the length of the retort and back, and the motion of the stirrers may be regulated by cone-pulleys to carry the material faster or slower.

To ascertain the condition of the material in the retorts, I employ a tester (shown in Fig. 5) for each retort, each tester being a rod, P, with a recess or pocket, P', in one side, and fitted in a stuffing-box, $P^2$, so as to slide into and out of the material in any desired part of the apparatus. The stuffing-boxes of the testers are rigidly attached to any desired portions, preferably to the pipes B and J. By drawing out the rod P a portion of the material is withdrawn in the pocket P', and can be examined. After the material is sufficiently dry it passes through the pipe J into a tightly-closed receptacle, Q, from whence it may be removed for use, as hereinafter described.

During the drying operation just described the steam and gases evolved from the material by the heat and agitation are drawn through the pipe H by a vacuum-pump, R, which may be of any suitable construction. The pipe H terminates in a downwardly-extending worm, S, passing through a tank, T, which is kept full of cold water, whereby the steam drawn through pipe H is condensed, the condensed water, together with the gases, passing through an air-chamber, U, in which the worm S terminates, to a pipe, V, which passes directly to the pump R. The pump forces the water and gases through a pipe, W, into a jacket-kettle, X, the pipe W extending nearly to the bottom of said kettle. The kettle is surrounded by a jacket, which receives free steam from a boiler or exhaust-steam, and has a suitable inlet and outlet pipe for steam. The water and gases introduced into the kettle X are heated by the steam-jacket sufficiently to vaporize the ammonia without vaporizing the water, and the ammonia and gases escape through a pipe, Z, into the tank N, where the ammonia is fixed as sulphate of ammonia, and the remaining gases pass off through pipe N', deodorizer O, and pipe $N^2$ to a furnace, as already described. The steam and gases are thus removed from the retorts A A', deprived of all the free ammonia they contain, and finally consumed, without the escape of any offensive odors or injurious gases.

To assist the pump R in maintaining a vacuum and drawing the steam and gases from the retorts A A', I employ a vertical stand-pipe, $b$, terminating at its lower end in a tank, $c$, and at its upper end in a worm, $d$, which extends downwardly through a tank, $e$, into the upper part of the air-chamber U. The tank $e$ is kept full of cold water, and the stand-pipe $b$ contains water, which is supported therein by atmospheric pressure, the upper end of the pipe having no opening excepting through the worm $d$ into the air-chamber, which is practically air-tight. The vertical portion of the stand-pipe $b$ is about thirty-two feet in height, (preferably somewhat more,) so that the water therein cannot be drawn into the air-chamber U by a vacuum in the latter.

It will be seen that the water in stand-pipe acts as a piston, having a constant tendency to draw the gases in the chamber U into the worm $d$, and thus aid the pump R in drawing the gases from the retorts. The steam, if any, drawn into the worm $d$ is condensed therein, the condensation enabling the worm to receive more gases, and thereby assisting in maintaining a vacuum.

The stand-pipe is not absolutely essential to the operation of the apparatus, but it is an important auxiliary, as it enables me to employ a pump, R, of greater capacity than could be used without the stand-pipe.

When the desiccated material is being discharged from the retort A' through the pipe J, I disinfect or deodorize it by any suitable antiseptic, as carbolic-acid vapor generated in a close retort, $f$, which is heated by the furnace C, and is provided with a pipe, $f'$, having a perforated end located under the discharge-pipe J, as shown in Figs. 2 and 3$^a$.

$g$ represents a roof or guard over the pipe $f'$, to prevent its perforations from being obstructed by the descending material.

Dry carbolic acid or other suitable material being placed in the retort $f$, antiseptic vapor is generated, which passes through pipe $f'$ and mingles with the material, which is in a dry heated condition. The vacuum in the receptacle Q causes the vapor to enter and permeate the material, and the heated condition of the latter causes it to absorb more of the vapor than it could if it were cold or damp.

It may be here stated that the air is removed from the receptacle Q and a partial vacuum is maintained therein by the vacuum-pump already described.

I provide the receptacle Q with a rotating stirrer and propeller, $h$, to eject the material from the receptacle Q through a pipe, Q', into barrels or other receptacles.

The described operation produces a fertilizer possessing all of the valuable properties of the original material, the ammonia retained in the tank N in the form of crude sulphate of ammonia being added to the dry material from the retorts, the mixture or product being a complete fertilizer without disagreeable odors or noxious gases.

The heat to which the material is subjected and the subsequent deodorizing destroy the spores of infectious diseases in night-soil or any decomposed matter; hence the invention is of great value as a sanitary measure.

The apparatus as described is adapted to treat any offensive matter suitable for fertilizers, such as swill and garbage, dead fish, or putrefying flesh.

The steam which is employed in the various parts of the apparatus and as a motor for the pump and the stirring and propelling devices is furnished by a boiler or generator, $l'$, located preferably by the side of the retort A, as shown in Fig. 2.

I claim as my invention—

1. The hereinbefore-described process of depriving night-soil or other raw fertilizing material of its noxious gases and injurious properties and converting it into a dry innoxious fertilizer having all the valuable properties originally contained in the raw material, said process consisting in heating the raw material for the double purpose of desiccating it and expelling its noxious gases and vapors, mingling antiseptic vapor with the desiccated material, to destroy any noxious gases and spores of infectious diseases not removed by desiccation, saving or fixing in the form of crude sulphate of ammonia the free ammonia necessarily escaping with the gases and vapors during the desiccating operation, and mixing the crude sulphate of ammonia with the disinfected desiccated material to complete the fertilizer, the latter being then ready for transportation and use.

2. The within-described process of destroying noxious gases and spores of infectious diseases in desiccated night-soil or other fertilizing material, consisting in mingling carbolic-acid or other antiseptic vapor with said material while it is in a dry heated condition and contained in a tightly-closed receptacle, as set forth.

3. In combination with a receptacle for containing and desiccating night-soil or similar material, a stuffing-box connected therewith, and a tester, P, adapted to reciprocate in the stuffing-box and withdraw a sample of the material for examination, as set forth.

4. The combination, substantially as set forth, of a retort having a rotating stirring or propelling device, a pipe, H, communicating with said retort, a condensing apparatus to condense steam passing through said pipe, a vacuum-pump to draw steam and gases through the condensing apparatus and to force onward the condensed water and gases, an air-chamber located between the condenser and the pump, and a kettle or heater connected to the pump to heat the condensed water, and a tank for containing sulphuric acid connected to the kettle or heater.

5. The combination of the connected retorts A A', a chamber, F, connected to said retorts, the pipe H, communicating with the chamber F, the vacuum-pump R, the condenser S T, the pipe W, the kettle or heater X, and the tank N, all arranged and operating substantially as described.

6. The retorts A A', the pipe H, the condenser S T, and the vacuum-pump R, combined with the stand-pipe $b$, the condenser $e$ $d$, and the air-chamber U, whereby the pump R is aided in its operation, as set forth.

7. In a stirrer or propeller, the combination of a hexagonal or many-sided shaft, a series of collars, each having correspondingly-shaped socket E$^3$ to fit on said shaft, and two or more many-sided orifices, $E^6$, and arms $E'$, having many-sided lugs $E^5$, adapted to fit the orifices $E^6$, as and for the purposes set forth.

8. In combination with the pipe J and receptacle Q, the retort $f$ and pipe $f'$, whereby the desiccated material is subjected to antiseptic vapor, as and for the purpose set forth.

In testimony whereof I have signed my name to this specification, in the presence of two subscribing witnesses, this 15th day of December, 1879.

WILLIAM PLUMER.

Witnesses:
C. F. BROWN,
GEO. W. PIERCE.